UNITED STATES PATENT OFFICE.

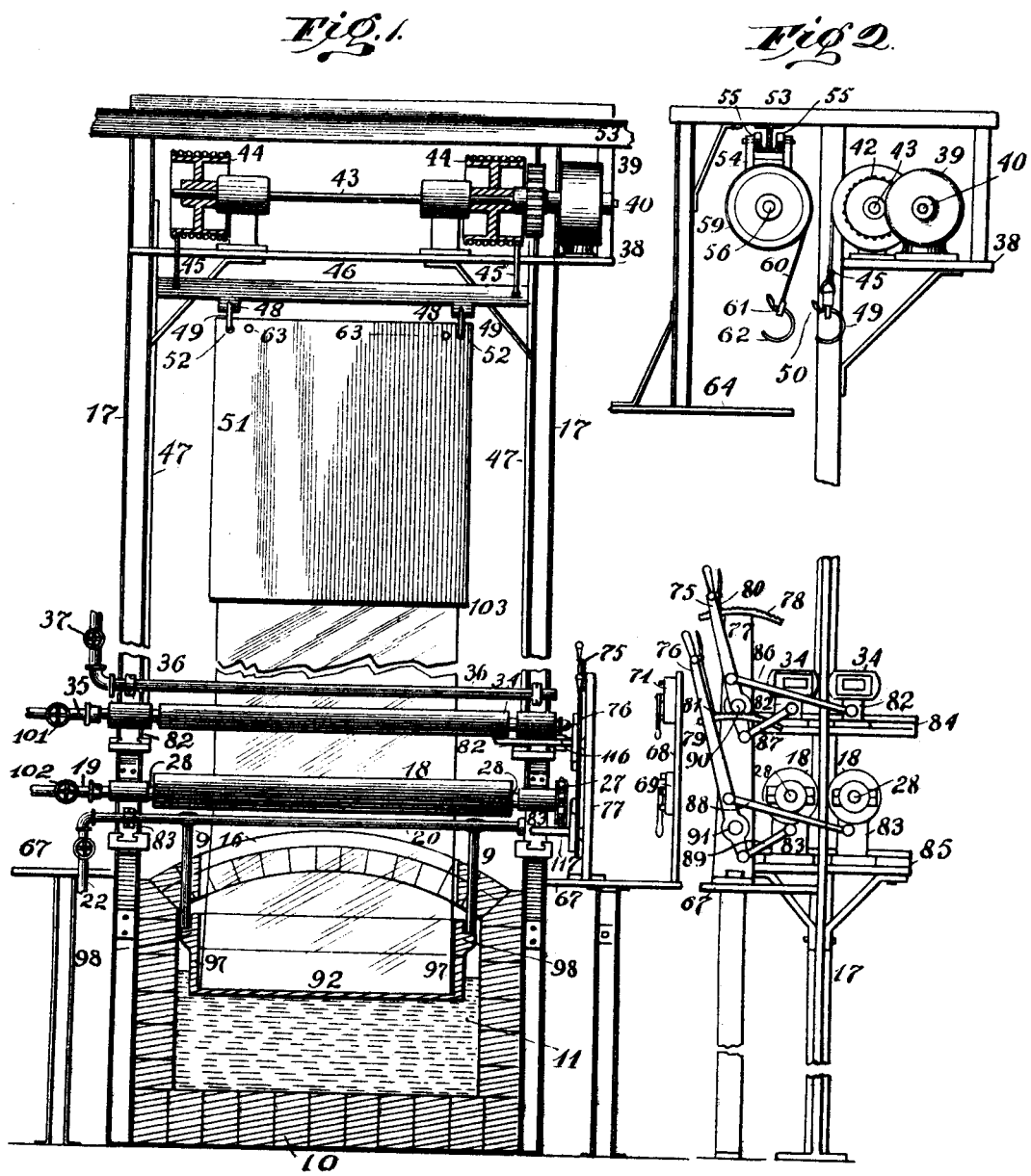

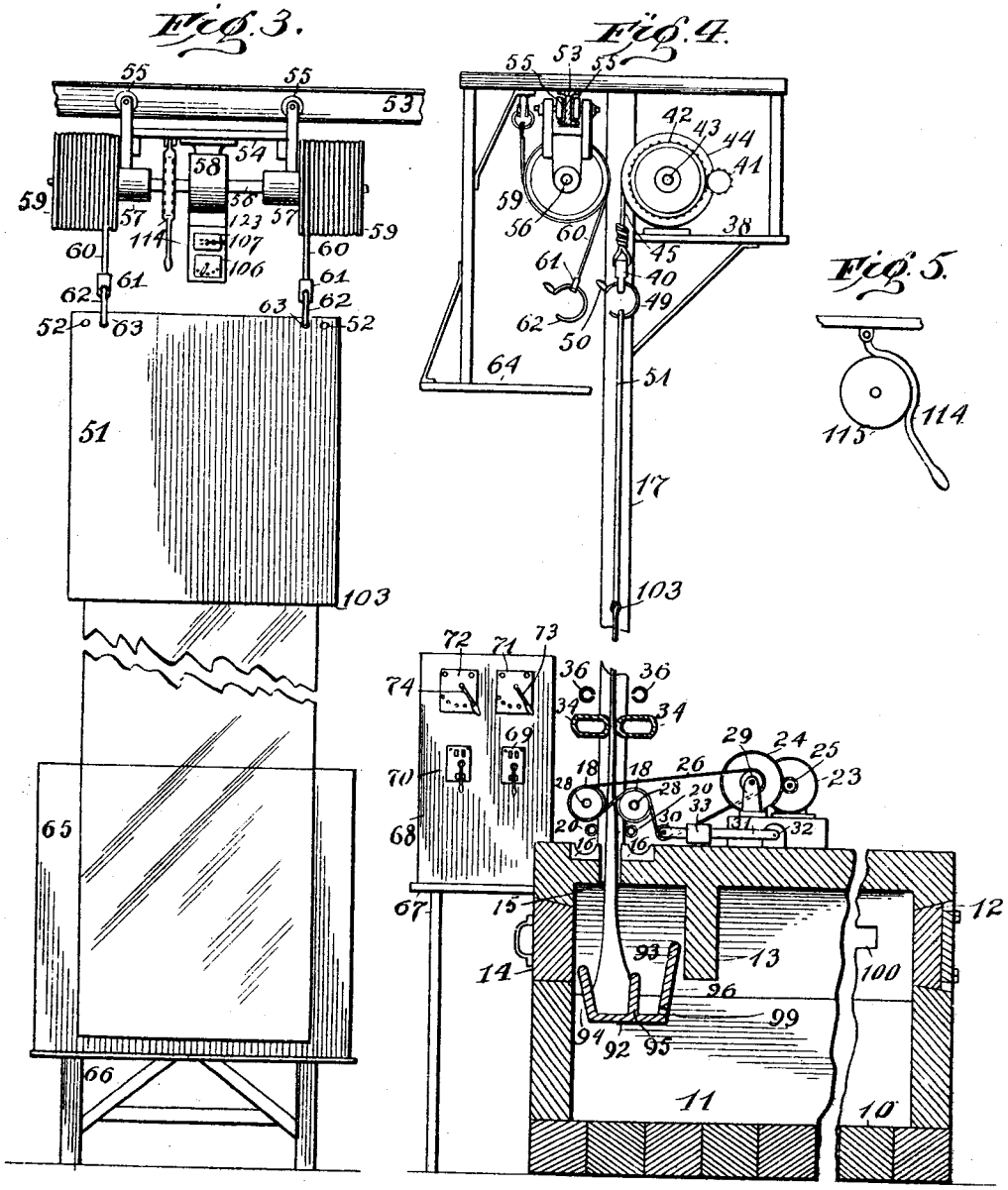

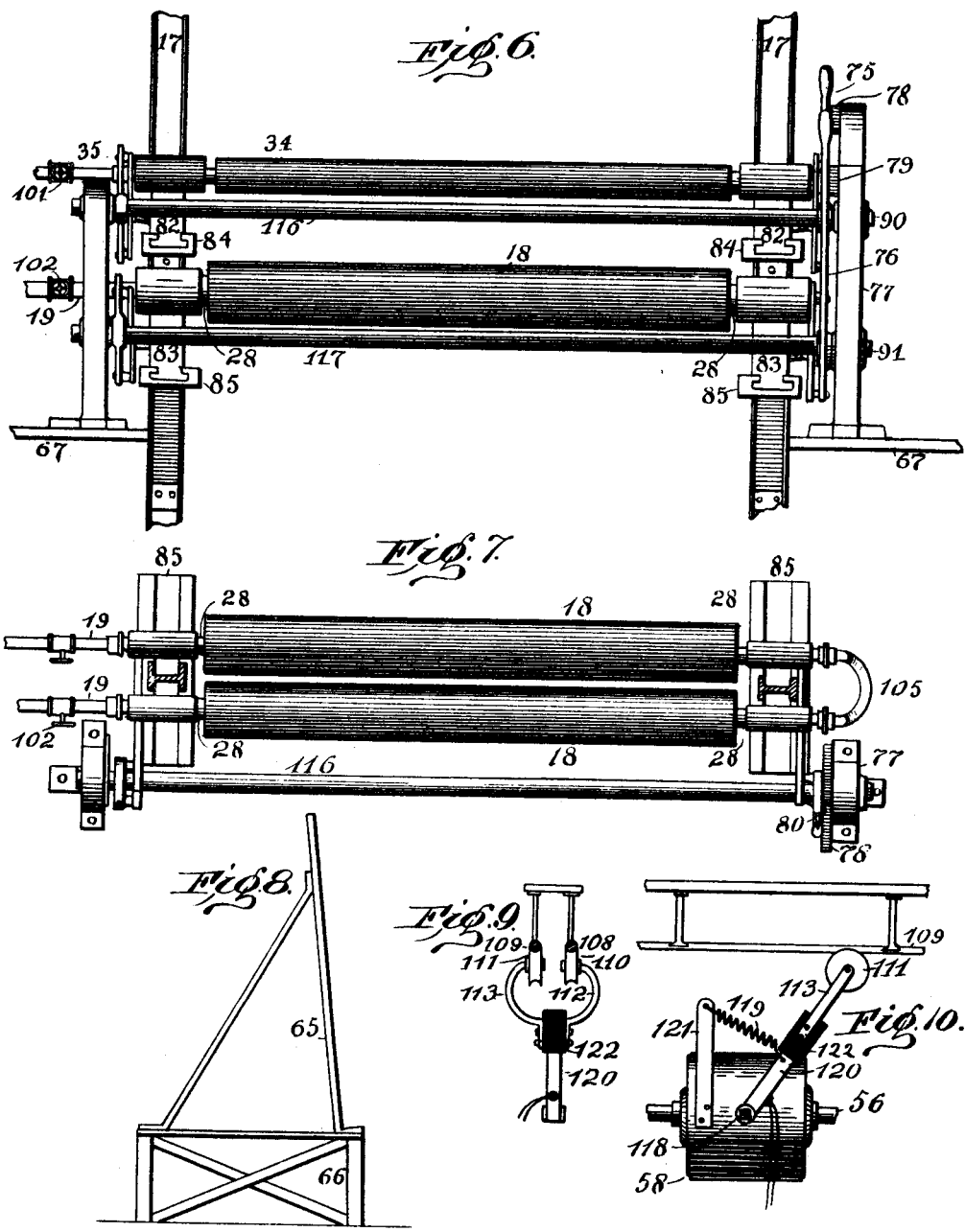

IRVING W. COLBURN, OF TOLEDO, OHIO.

GLASS-WORKING MACHINE.

SPECIFICATION forming part of Letters Patent No. 696,008, dated March 25, 1902.

Application filed March 22, 1899. Renewed August 17, 1901. Serial No. 72,385. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for rolling, pressing, and stretching plastic glass into sheets for the purpose of manufacturing plate and window glass; also, in connection therewith a means for collecting a measured and prescribed quantity of plastic glass for each single operation, said collection being made below the surface of the molten glass, whereby it is procured free from scum, impurities, and floating particles, so that the finest quality of sheet-glass can be made directly from said measured quantity by the above-named operation of rolling, pressing, and stretching. By this improved means I am enabled to utilize the largest-sized glass-melting tanks for the purpose and readily gather, roll, press, and stretch into plate and window glass the entire melting capacity of the tank with a small amount of attendance. I am enabled thereby to dispense with the workmen known as "gatherers," "blowers," "snappers," and "flatteners." The employment of a floating gathering and measuring vessel in conjunction with means for collecting a measured quantity does away with the gatherers, while the rolling, drawing, dressing, and stretching mechanism enables me to dispense with the blowers, snappers, and flatteners. This apparatus therefore enables me to accomplish with a very few men—*i. e.*, one skilled glass-worker and three helpers or attendants—the work that is now accomplished by a much larger number of men working by the hand process of making sheet-glass and to produce better work at a speed of production never approached in handwork. It enables me to produce sheet-glass with a perfectly smooth, even, clear, and brilliant surface ready to be cut into sheets of the proper size and carried direct to the annealing-ovens without further manipulation. I am also enabled to produce window-glass of a perfectly even thickness and to vary the thickness at will, if desired. I can produce plates or sheets of any desired thickness, uniform or variable, the speed of the machine and all the regulating mechanisms being under perfect control during all stages of the operation.

My present invention is a species of the invention disclosed in my application concurrently pending herewith, Serial No. 713,353, filed April 17, 1899, in which I have claimed certain features also shown in this application, but not herein claimed. In that application I deal with the glass in large masses, drawing the same from a receptacle in a continuous stream, while in the present invention I lift the plastic glass from its receptacle while in a highly-viscous condition in separate gatherings by adhesion to a gathering-plate, afterward bringing it by means about to be described to the condition of a finished sheet.

The object of the invention is by means of suitable mechanical appliances working in coöperation to withdraw an unformed gathering of plastic glass from a receptacle of such glass kept at the proper temperature, to flatten such gathering into a plate by progressive regulated compression, to draw the plate forward as fast as formed under suitable nontorsional stress, and to grasp the plate on opposite sides as it leaves the compressing means by frictional appliances suitably lubricated when required and regulable and controllable as to the degree of pressure and friction applied, whereby the plastic plate is drawn, stretched, and attenuated above the grasping-point into a transparent sheet of desired thinness and brilliancy. Auxiliary to the means for performing these consecutive operations are appliances for keeping the compressing means and the grasping means at all times at the proper temperature for working the hot plastic glass and appliances for cooling, chilling, and setting the plastic sheet as soon as sufficiently drawn and stretched, so that it will preserve the form and polished surface given to it in the act of stretching. There are appliances also for transporting the finished sheet out of the machine to a place where it can be cut up into suitable commercial sizes.

In the drawings forming a part of this specification, Figure 1 is a front elevation, partly in section, of the glass-tank, floating vessel therein, main frame, pressure-rolls, pressure-bars, means for operating same, working platform, metal drawing-plate, operating-motor, and a sheet of glass attached to said plate by a glass seal at a midway stage of the operation. Fig. 2 is an end elevation showing the operating or drawing motor on the upper platform, the main frame, the traversing motor and the mechanism for operating the pressure-rolls and the pressure-bars, the platform for the same, and the upper working platform. Fig. 3 is a front elevation showing the drawing-plate, with a suspended sheet of glass attached, broken away in the middle, and the cutting-table underneath, on which the glass is cut up into commercial sizes, also the traversing motor and accessories. Fig. 4 is a side elevation, partly in section, showing the melting and refining tank, the floating vessel therein, the rolls, the motor for operating the rolls, the pressure-bars, means for heating the rolls and cooling the glass, the switchboard, the operating or drawing motor, the traversing motor, the metal drawing-plate, and the sheet of glass at the same stage of operation as in Fig. 1. Fig. 5 is a side view of the hand-brake shown in the upper part of Fig. 3. Fig. 6 is a front elevation showing the rolls and pressure-bars and details of the operating mechanism therefor. Fig. 7 is a plan view of the rolls and operating mechanism, showing also the water circulation. Fig. 8 is a view of the inclined cutting-table. Fig. 9 is a detail view showing the mode of introducing the electrical current to the traversing motor. Fig. 10 is a side view of the device for introducing the electrical current to the traversing motor.

Like numerals of reference refer to like parts on the several figures.

Referring to the drawings, 10 represents a glass-melting tank, preferably arched on the top, broken away in the middle, as shown in Fig. 2, to economize space.

11 is the melted glass in the tank. The melting is preferably done with gas and by the regenerator process, flame being admitted by flame-ports, one of which is partially shown at 100, arranged in the parallel side walls on both sides toward the rear.

12 is the charging-hole in the rear wall, closed by a door having suitable means for operating the same.

13 is a depending bridge-wall separating the upper front portion of the tank from the upper middle and rear portion.

14 is an opening in the front wall closed by a door provided with suitable means for opening and closing.

15 is a slit in the arch or covering-wall of the tank to admit of the passage of the glass to be worked.

16 16 are trough-like castings located on each side of slit 15 to protect the arch at this point and exclude falling refuse.

9 9 are vertical rods passing through the arch for a purpose hereinafter described.

Above the arch of the tank, over the slit or opening 15, is erected the stretching and drawing mechanism of the apparatus, mostly carried on platforms borne on two upright columns, preferably I-beams 17 17. Nearest the aperture or slit 15 are to metal rolls 18 18, mounted in suitable bearings and arranged so as to be capable of approximation and separation by suitable mechanisms, the space between them being at all times directly over slit 15. These rolls are hollow and are supplied with means for circulating a current of water through them drawn from a suitable source of supply. Also located near the rolls are the horizontal pipes 20 20 for the purpose of taking the chill off from the surfaces of the same at the beginning of the operation, said pipes being supplied with jets or nipples or simply perforations and connected with a suitable source of gas-supply by pipe connections 22. Rotary motion is communicated to the rolls from an electric motor 23 or other suitable source of power, preferably located on a convenient base near by, or, as shown, on the arch of the tank. 24 represents a gear-wheel meshing with the pinion 25 on the armature-shaft of the motor, by which the speed of said armature is reduced to the proper rate and the motion is communicated to the rolls 18, preferably by means of an endless sprocket-chain 26, which enwraps sprocket-gears 27 27 on the ends of the roller-shafts 28 28, and the pinion 29 of the gear 24, passing between the sprocket-gears on the roll-shafts to give the requisite coöperative direction to the rotation of the rolls. Said chain 26 is long enough to have a bight in the slack thereof, in which runs the idle sprocket-pulley 30, mounted on the end of a radius-arm 31, pivoted at a fixed point 32. On said radius-arm is a movable weight 33 of sufficient mass to keep the sprocket-chain always tight at the required tension to drive the rolls.

Directly above the rolls 18 are located two pressure-bars or drawing-bars 34 34, also mounted on the supporting-columns 17 17 in suitable bearings, and these pressure-bars, as well as rolls 18, are borne on movable supports or pedestals sliding in horizontal ways, so as to be capable, by means of suitable mechanism hereinafter described, of approximation and separation while the space between them is maintained in constant alinement with the space between the rolls and space or slit 15. The said pressure-bars are preferably made of metal, are hollow, and are provided with a means of water circulation (pipe 35) from a suitable source of supply similarly to that provided for rolls 18. Directly over the pressure-bars or drawing-bars 34 are located two horizontally-placed pipes 36 36, provided with slits or a series of apertures along their inner or facing sides and connected with a suitable source of air-supply under pressure.

37 is a suitable cock or valve for turning on and off said air-pressure supply and regulating the same.

High up in a framework supported by the vertical columns 17 is located on a suitable platform 38 a motor 39, preferably electric, whose armature-shaft 40 is connected by a suitable train of gearing 41 42 with a horizontal rotary shaft 43, carrying drums 44 44, on which as said shaft is revolved by the said motor wind or unwind the flexible bands, ropes, chains, or wire cords 45 45, firmly connected at their lower ends to the transverse bar 46, which as said ropes or cords wind or unwind upon the drums travels up or down in a horizontal position, being guided at the ends in or upon guideways 47 47, affixed to the vertical columns 17 17. Said transverse bar has perforations 48 48, in which loosely run the circular segments 49 49, provided with handles 50 50. These segmental rings can be rotated in the said perforations 48 by the said handles, and they thus serve the function of detachable hooks, as hereinafter described. Suspended by means of said hooks to the transverse bar 46 is a metal sheet or plate 51 by one edge thereof, in which are perforations 52, into which the segmental rings or hooks 49 detachably engage. This sheet or plate hangs in a vertical plane directly over the passages between pressure-bars 34, rolls 18, and slit 15. Its function is presently to be described.

At the top of the framework, supported by the vertical columns 17, is also sustained one portion of a horizontal trackway 53, which may be either straight or circular, preferably the latter, to give a return-circuit. On this trackway runs a suspensory carrier or car 54, borne by wheels 55 55, which carries a horizontal rotary shaft 56, sustained in suitable bearings 57, a motor 58, preferably electric, by which said shaft 56 is rotated, and drums 59 59, mounted on said shaft and rotating with it. These drums have suspensory bands, ropes, chains, or wire cords 60 60, which wind and unwind thereon as the shaft 56 is rotated, similar to the bands on drums 44, and said bands or ropes carry at their lower extremities blocks 61, perforated to receive segmental rings or ring-hooks 62 62, similar in function to the ring-hooks 49. These drums and suspensory bands or chains are somewhat nearer together than are the drums and chains on shaft 43, as the ring-hooks 62 hook directly into sheet or plate 51 in apertures 63, specially provided for that purpose. A suitable platform 64 is sustained at the top of the machine to afford a footing and working space for the helper at that point.

Attached to the motor 58 is a dependent switchboard 123, within easy reach of the attendant on platform 64, carrying a regulating-rheostat 106 for said motor 58 and a reversing-switch 107 to enable the operator to regulate the current and turn it on and off and to reverse the same in order to reverse the direction of revolution of the drums 59 when necessary. The current is brought to the motor in this case on the positive and negative wires 108 109, Fig. 9, on which run the conductor-trolleys 110 111, conveying the current to the rheostat and the reversing-switch through the two conductive insulated arms 112 113 and thence to the armature of the motor. The arms 112 113 are pivoted to the motor at 118, and the trolley-wheels 110 111 are held up against the conductor-wires 108 109 by the tension of the spring 119, attached to said arms at 120 and to a fixed stud 121 on the motor. An insulating-block 122 is provided to separate the currents from the two wires where they join the inner insulated wires that pass to the rheostat and reversing-switch on the depending switchboard.

114 is a hand friction-brake operating on friction-drum 115, by which the operator modifies the rate of descent and ascent of the sheet of glass being cut up on the cutting-table in accordance with the needs of the cutter.

65 is an inclined cutting-table supported on a suitable framework 66 and located at a convenient point directly under the elevated trackway 53 to receive the glass transferred from the machine to be cut up.

67 is a platform built around the front and sides of the tank at a proper elevation and strongly supported to afford a working floor for the attendants. It also sustains a switchboard 68, upon which is mounted two reversing-switches 69 70 for reversing the currents and the direction of rotation of the motors and also two regulating-rheostats 71 72, which by means of the radius-arms 73 74 enable the current which supplies energy to the electric motors 39 23 to be turned on and off and to be graduated and regulated at will, or in practice the current may be turned on and off by the reversing-switches, leaving the rheostats a regulating function solely. Electric energy is conveyed to both these motors from a suitable source of supply through conductor-wires concealed in the frame of the apparatus. On the platform 67 is also sustained the mechanism by which the attendants operate the movements of the rolls and the pressure-bars, an end elevation of which is shown in Fig. 2. This mechanism comprises, essentially, the rocking levers 75 76, pivoted upon a standard 77 and supplied with curved locking-racks 78 79 and hand-lever pawls 80 81 to engage therewith for locking said lever into any desired position. The pedestals 82 82 83 83 of both the pressure-bars and the rolls are movably mounted in horizontal lubricated ways 84 85, and said pedestals are connected to the rocking levers, respectively, by pivoted links 86 87 88 89, pivotally attached also to the said rocking levers above and below the rocking centers of the levers at equal distances therefrom. This arrangement gives a simultaneous and equal approximation or separation to the rolls and pressure-bars, respectively, as the rocking levers are manipulated by the attendant; but any other equivalent mechanical device can be employed. To insure parallelism between the rolls and pressure-bars, respectively, in all positions, the pivots 90 91 of the rocking levers are rocking shafts 116 117, extending across the machine, connecting with similar rocking levers at the other end of said rolls and pressure-bars connected similarly to the sliding bars or pedestals by similar pivoted link connections. This duplication is not shown in Figs. 1 and 4 to avoid complication of details, but is shown in Figs. 6 and 7.

Returning now to the tank, 92 is a floating vessel made of some refractory substance of a less specific gravity than molten glass, preferably pot-clay. It is of such dimensions as to nearly occupy the horizontal area of the chamber 93 of the tank in front of bridge-wall 13, but freely rising and falling therein. Besides a bottom it has three upright transverse walls of different heights 94 95 96, with end closures 97 97, said end closures having thickenings or bosses 98 98 formed thereon at about the position of the middle wall. The rear wall 96 is the highest and is so formed to serve as a protection from the heat radiation in the rear. The front wall 94 is of medium but sufficient height, and the middle wall 95 is the lowest. A series of perforations 99 are made in the bottom or close to the same in the rear wall at its base. The front recess between the front and middle walls is directly beneath the slit or opening 15 of the tank-arch. This vessel floats at all times by the buoyancy of its material.

The prepared mixture forming the working stock is introduced at intervals through the rear opening or charging-hole 12 as the plastic batch is reduced at the front by the operations of working. The melting is done at the rear. The glass as it flows forward under the influence of intense heat gradually becomes more homogeneous and refined. The object of the depending bridge-wall 13 is to protect the front chamber 93 in a measure from the intense heat, so as to allow the molten glass to assume the requisite degree of plasticity and coherence and get in a condition to be gathered and manipulated by parting with a portion of its heat of liquefaction. The rear wall 96 of the vessel 92 also coöperates to this end. When it is desired to work a gathering of plastic glass, the vessel 92 is partially submerged by means of pressure applied to the rods 9 9, passing down through the arch and resting upon the bosses 98. This pressure by sinking the vessel lower in the plastic material until the top of middle wall 95 is lower than the level of the plastic glass causes the said glass to flow by hydrostatic pressure through the perforations 99 into the rear chamber of the vessel, over the middle wall, and into the front chamber of the vessel, whence the gathering is taken. The object of this mode of procedure is twofold—first, the glass which enters the vessel 92 is taken wholly from below the surface of the metal in the tank, thus avoiding scum, floating refuse, and impurities and collecting only refined glass of proper quality for working; second, the front chamber can in this way be filled to a desired height with a specific and measured quantity of material, which is important, as the amount of the gathering should be proportioned to the work to be accomplished.

The object of the opening 14 is to provide for examination of the tank and the vessel 92 and also to enable said vessel to be removed when necessary for cleaning or repairs. The object of the slit or transverse opening 15 is to enable the iron sheet or plate 51 to be lowered vertically into the batch of plastic glass to receive a gathering thereon and to provide a passage for the exit of the glass to be manipulated. The guttered castings 16, as before said, protect the slit and the arch and exclude falling refuse.

The object of the bight in the sprocket-chain which drives the rolls 18 and the weighted idle sprocket-pulley running therein is to enable the rolls to be approximated and separated without interfering with their running motion under proper tension, which would not be the case if the rolls were driven by positive gearing. The object of the provision for heating the rolls by means of the gas-pipes 20 with jets is to prevent the rolls from chilling the plastic glass at the beginning of the operation. The object of the provision for cooling the rolls is to prevent overheating by contact with the plastic glass and to maintain them at the proper temperature. This is effected by means of the pipe 19, which communicates with the interior of one of the hollow rolls, then across to the other roll by a flexible or expansible connecting-pipe 105 and suitable couplings, and thence by a suitable outlet provision to the outside circulation. A similar water circulation for a similar purpose is provided for the hollow pressure-bars or drawing-bars 34 34. Suitable cocks for letting on and shutting off the water from these circulations are provided at 101 102. Both the rolls and the pressure-bars may be paste-covered when the work in hand is such as to demand it.

The object of the pipes 36 is to supply a blast of cool air under pressure directly on each side of the sheet of plastic glass as it leaves the pressure-bars to assist in the cooling and setting of the glass. The air-pressure in these pipes is under hand regulation by means of the hand-wheel and valve 37.

The object of the metal sheet 51 is to afford a means for gathering plastic glass on the lower edge thereof when lowered through the slit 15 into the measured quantity prepared for it in the vessel 92 preliminary to raising and rolling and drawing and stretching the same by the mechanism provided. Said sheet or plate is prepared for the work of gathering the adhering mass of glass by means of a glass seal 103, previously attached and caused to adhere thereon.

Operation: The tank 10 has been supplied with its different batches of glass until it is full of fused glass and at the correct heat for working. Refined glass has passed from the middle of the tank to front end thereof. In this journey it has passed from the direct action of the melting and mixing flame, under which flame it was maintained at a high degree of heat. As the glass reaches the front end of the tank it has passed from its higher state of fluidity into a plastic state. This plastic state at the front end of the tank is hastened by means of the bridge-wall or other similar means, which cuts off the heat radiating from the rear portion of the tank. The vessel 92 is floating upon the plastic glass in chamber 93. The rear chamber in the clay vessel is at all times filled with glass at the level of the glass in other parts of the tank. As the rods 9 9 are pressed the vessel 92 descends deeper into the mass of plastic glass, and glass flows or passes over the middle wall 95 of vessel 92 into the front chamber, the glass having previously passed into the rear chamber through the holes at the bottom of rear wall 96, one of which is shown in section at 99, Fig. 4. None but refined glass free from floating particles, scum, dirt, &c., can make this passage, as the glass all comes from beneath the surface. The correct and desired amount of plastic glass having been gathered in the front chamber of vessel 92, the rods 9 9 are raised by the attendants, and vessel 92 again floats, with the bridge-wall 95 in same dividing its gathering of plastic glass between the front and rear chambers. The motor 23 is now brought into operation by means of its switch 70 and rheostat 72. The rolls 18 18 and pressure-bars 34 34 are separated to their greatest extent by the levers 75 and 76. The motor 39 is put into operation or motion by means of its switch 69 and rheostat 71. This brings the plate 51, with its seal of glass upon the lower edge thereof, down past the pressure-bars 34 34 and the rolls 18 18 into contact with the plastic glass in the front chamber of vessel 92. At the moment of contact and slight immersion of the seal of glass on the plate 51 with the plastic glass the motor 39 is stopped. As soon as the seal of glass 103 has made suitable contact and adheres to the mass of plastic glass the motor is started in the opposite direction by means of the reversing-switch 69, and the plate 51, with its gathering of plastic glass, is lifted, carrying with it a mass of glass of varying thickness. The rolls 18 18 are now by means of lever 76 brought into contact with the said mass of plastic glass and revolved in same direction as the passage of the plastic glass. This action of rolls 18 18 serves two purposes. They roll the sheet of glass of varying thickness to a specified uniform thickness or to a varying thickness, as may be desired. They also assist in the lifting of the mass of glass, which is quite plastic at this time. They also in a measure cool the plastic glass by contact. The plastic glass now passes between the pressure-bars, paste-covered or not, as may be desired, according to work in hand. These pressure-bars concentrate and solidify the glass by bringing the molecules into closer contact and relation, with the result that the pressure given the plastic glass with the rolls and pressure-bars works out any air-bubbles and makes the glass dense and free from creases, cross-lines, &c. These bars also furnish the desired resistance or friction to pull against and to enable the stretching of glass to take place. Immediately after passing the pressure-bars 34 34 the plastic glass receives its final stretching, which is mainly done directly above the pressure-bars before it is cooled beyond plasticity by the perforated air-pipes 36 36. Passing said pipes 36 36 the glass is cooled and set, so that very little stretching is accomplished afterward. The drums 44 continue to revolve until they have in the rising of the plate 51 carried with it the entire gathering of plastic glass collected in the measuring-chamber of the vessel 92, and the front chamber of said vessel thus being empty is now ready for a second gathering of plastic glass. The action that the plastic glass undergoes when under these manipulations is first to be additionally cooled in the vessel 92. After attachment is made to the plate 51 it is drawn out slightly, which assists to better concentrate the glass. It passes through the rolls, which roll to a desired surface corresponding with the surface of the rolls. This action of the rolls slightly cools the surface and forms a slight opacity thereon. The sheet of glass next passes between the pressure-bars. This action of the pressure-bars further concentrates the glass and makes it more dense. The stretching begins immediately after it passes the draw or pressure bars. This action is such as to destroy the slight opacity of surface produced by the rolls and produces by the rearrangement of the molecules in the plastic glass and on the surface the most smooth, clear, and transparent surface possible. This action is assisted by the ironing, pressing, drawing, and stretching of the plastic glass while and after passing the draw or pressure bars. The sheet of glass having been rolled, ironed, pressed, concentrated, drawn, and stretched into the desired sheet and properly cooled, the entire gathering of glass from the front chamber of vessel 92 having been exhausted and manipulated into the long sheet of glass and passed from out the rolls and pressure-bars, the motor 39 is stopped by means of the rheostat 71. An attendant upon the platform 64 on top of the framework now takes hanging-rings 62 and inserts them into holes 63 of plate 51 and with the aid of the lifting-motor 58 takes tension off the ring-hooks 49, and thus being able to release rings 49 now takes said rings from out the plate 51. He thus has transferred the plate 51, with its adhering sheet of glass, from the glass-working machine to the carrying-car. He now moves the carrying-car along on the track 53 until it is over the inclined cutting-table 65, when he lowers the sheet of glass upon the table, and a cutter there stationed cuts the sheet of glass into desired sizes as the sheet of glass is fed down to him until he has exhausted all the glass adhering to this plate 51. The glass now being cut into proper-sized sheets is carried to the annealing-ovens. Meantime during the cutting-up operation a second sheet 51 has been inserted in the glass-machine and a second operation has begun, and so on as fast as the glass is melted, refined, and worked into the proper condition of plasticity in the tank for proper manipulation.

I claim and desire to secure by Letters Patent—

1. In the making of sheet-glass, in combination, a receptacle for hot plastic glass, means for gathering a portion of plastic glass from said receptacle, means for compressing said portion of glass into a sheet or plate, and means for positively drawing said sheet by the outer extremity thereof against the resistance of said compressing means, whereby it is stretched and attenuated to a state of clearness and transparency, substantially as specified.

2. In the making of sheet-glass, in combination, a receptacle for hot plastic glass, a gathering-plate for withdrawing a portion of plastic glass from said receptacle, means for guiding said withdrawn portion in a straight, non-torsional path, means for progressively compressing said portion into a sheet or plate, and means for positively drawing said sheet by the outer extremity thereof against the resistance of said compressing means, whereby it is stretched and attenuated to a state of clearness and transparency, substantially as specified.

3. In the making of sheet-glass, in combination, a metal plate, means for bringing said plate edgewise into contact with hot plastic glass, means for withdrawing said plate with glass attached to its contacting edge portion, and means for compressing said glass into a sheet as it is withdrawn, substantially as specified.

4. In the making of sheet-glass, in combination, a metal plate, means for moving and guiding said plate in a straight path, means for contacting the advancing edge portion of said plate with glass at a plastic temperature, means for withdrawing said metal plate with glass attached, means for compressing said glass into a sheet as it is withdrawn, and means for grasping said sheet frictionally, whereby it is stretched and elongated by the withdrawing force, substantially as specified.

5. In the making of sheet-glass, in combination, a vertically rising and falling metal plate, means for guiding said plate in a straight non-torsional path, a tank for holding plastic glass in said path, means for contacting said plate with plastic glass in said tank by its lower edge portion, means for elevating said plate and attached glass, means for rolling said glass into a sheet or plate of desired thickness as it rises, and means for pressing, drawing and stretching said sheet or plate of glass by frictional restraint as it is drawn upward, substantially as specified.

6. In the making of sheet-glass, in combination, a tank for holding hot plastic glass, a metal sheet or plate, means for moving said plate into contact with said plastic glass and withdrawing the same with glass attached, rolls for rolling said plastic glass into a thin sheet, means for graduating the distance between said rolls, means for heating said rolls, means for cooling said rolls, pressure-bars for grasping said rolled sheets, means for graduating and regulating the pressure of said pressure-bars, and means for cooling said pressure-bars, substantially as specified.

7. In an apparatus for making sheet-glass, in combination, a tank for holding hot plastic glass, a vessel floating on said plastic glass, means for procuring a measured quantity of plastic glass in said vessel, a metal plate, having a seal of glass adhering to its lower edge, means for contacting said seal with the measured quantity of plastic glass in said vessel, and withdrawing the same with the adherent glass, means for rolling the glass adhering to said seal into a sheet or plate, and means for pressing, drawing and stretching said sheet or plate to the required thickness and transparency, substantially as specified.

8. In an apparatus for making sheet-glass, in combination, a receptacle for segregating a measured quantity of plastic glass, a metal plate with a glass seal on its edge, and means for making adhesive contact of the seal with said plastic glass in said receptacle, means for withdrawing said metal plate and attached glass, and a pair of rolls for compressing said glass into a sheet or plate as it moves between the said rolls, substantially as specified.

9. In an apparatus for making sheet-glass, in combination, a receptacle for segregating a measured quantity of plastic glass, a gathering-plate for lifting glass from said receptacle by adhesion, means for compressing said glass into a plate or sheet as it rises, means for grasping said plate frictionally as it continues to rise, whereby it is pressed, drawn and stretched to a sheet of the requisite thickness and transparency, and means for cooling and setting said sheet, substantially as specified.

10. In an apparatus for making sheet-glass, in combination, a receptacle for segregating a measured quantity of plastic glass, a gathering-plate for lifting glass from said receptacle by adhesion, a pair of rolls, with means for applying regulated pressure through said rolls to the plastic glass passed between the rolls, whereby the glass is flattened into a sheet or plate, a pair of pressure-bars, with means for applying regulated frictional pressure to said sheet or plate of glass after it leaves the rolls, whereby it is drawn and stretched to a sheet of the requisite thickness and transparency, and means for cooling and setting said sheet, substantially as specified.

11. In an apparatus for making sheet-glass, in combination, a receptacle for segregating a measured quantity of plastic glass, a gathering-plate for lifting glass from said receptacle by adhesion, a pair of rolls with means for applying regulated pressure to said glass as it rises, whereby it is flattened into a sheet or plate, and means for cooling said rolls by a water circulation therethrough, substantially as specified.

12. In an apparatus for making sheet-glass, in combination, a receptacle for segregating a measured quantity of plastic glass, a gathering-plate for lifting glass from said receptacle by adhesion, a pair of rolls with means for applying regulated pressure to said glass as it rises, to flatten the same into a sheet or plate, a pair of pressure-bars with means for applying regulated frictional pressure to said plate, whereby it is drawn and stretched into a thin transparent sheet, as it passes beyond the pressure-bars, and means for cooling said pressure-bars by a water circulation therethrough, substantially as specified.

13. In an apparatus for making sheet-glass, a tank for holding plastic glass, arched with fire-brick, a slit through said arch for permitting the withdrawal of plastic glass, and guttered guards 16 for protecting said slit, substantially as specified.

14. In an apparatus for making sheet-glass, a receptacle for hot plastic glass, means for gathering glass from said receptacle, a pair of rolls between which said glass is compressed into a sheet or plate, a pair of movable pedestals in which the bearings of said rolls are mounted, rocking shaft 117, rocking levers on the ends of said shaft, lever-handle 76, and links connecting said rocking levers with said movable pedestals, whereby the distance between said rolls is regulated at will, substantially as specified.

15. In an apparatus for making sheet-glass, a receptacle for hot plastic glass, means for gathering glass from said receptacle, a pair of rolls for compressing said glass into a sheet or plate, a pair of pressure-bars for making frictional contact with said sheet of glass, movable pedestals in which said pressure-bars are mounted, rocking shaft 116, rocking levers on the ends of said shaft, lever-handle 75, and links connecting said rocking levers with said movable pedestals, whereby the distance between said pressure-bars is regulated at will, substantially as specified.

16. In an apparatus for making sheet-glass, a means for gathering a portion and forming said gathered portion of plastic glass into a sheet, a means for frictionally grasping said sheet, a means for drawing and stretching said sheet when frictionally held, and a means for cooling and setting the said plastic sheet arranged above the said grasping means, substantially as specified.

17. In an apparatus for making sheet-glass, in combination, a gathering-plate for gathering a portion of plastic glass, a means for compressing said gathering into a plate, and a means for positively drawing or extending said plate by its extremity longitudinally without torsion into a sheet of the requisite thinness and transparency, substantially as specified.

18. In an apparatus for making sheet-glass, in combination, a means for gathering a portion of plastic glass, a means for progressively compressing said gathering into a plate, a means for frictionally holding said plate, and a means for drawing said plate in right lines progressively through said frictional holding means, whereby the plate is stretched to the requisite degree of thinness and transparency, substantially as specified.

19. In an apparatus for making sheet-glass, in combination, an upright frame having parallel guideways thereon, a bar traversing upon said guideways, means for moving said bar, a means for securing a gathering of plastic glass attached to said bar, a means for progressively compressing said gathering into a plate as the bar is moved, a means for frictionally holding and pressing said plate by non-rotatory grasping appliances as it is drawn by the bar, whereby the plate is stretched to a sheet of the required thinness and transparency, and means for cooling and setting the plastic material of said sheet, substantially as specified.

20. In an apparatus for making sheet-glass, in combination, a gathering-plate for securing a gathering of plastic glass by adhesion thereto, a pair of rolls for compressing said gathering into a plate or sheet, an electric motor for driving said rolls, and means for starting and stopping said motor, for reversing said motor and rolls, and for regulating the speed of said motor and rolls, substantially as specified.

21. In an apparatus for making sheet-glass, in combination, a gathering-plate for securing a gathering of plastic glass, a means for guiding said gathering longitudinally in right lines, a means for progressively compressing said gathering into a plate as it is drawn forward, an electric motor for moving said gathering and plate, means for starting, stopping, and reversing said motor, and means for regulating the speed of said motor, substantially as specified.

22. In an apparatus for making sheet-glass, in combination, an upright frame, a gathering-plate 51, an elevated trackway sustained in part by said frame, a traveling carrier running on said trackway, a rotary shaft on said carrier, winding-drums on said shaft, bands, ropes or chains on said drums, with means for attachment to said plate 51, and an electric motor connected with said rotary shaft, with means for starting, stopping, and reversing said motor, and means for regulating the speed of said motor, substantially as specified.

23. In an apparatus for making sheet-glass, in combination, a pair of rolls, means for heating the same, means for cooling the same, means for regulating the distance between the same, a pair of non-revolving pressure-bars, means for cooling the said bars, means for regulating the distance between said pressure-bars, and means for blowing a stream of air on both sides of a sheet of glass passing between said pressure-bars, substantially as specified.

In testimony whereof I affix my signature in presence of two witnesses.

IRVING W. COLBURN.

Witnesses:
ALEXANDER S. STEUART,
HENRY H. BATES.